US006224988B1

(12) United States Patent
Ueda et al.

(10) Patent No.: US 6,224,988 B1
(45) Date of Patent: May 1, 2001

(54) ADHESIVE COMPOSITION AND IMAGE FORMING MATERIAL

(75) Inventors: Eiichi Ueda; Akihisa Nakajima; Nobuo Kubo; Chiaki Nagaike; Yasuo Kurachi, all of Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/350,672

(22) Filed: Jul. 9, 1999

(30) Foreign Application Priority Data

Jul. 15, 1998 (JP) .......................... 10-216507

(51) Int. Cl.[7] .......................... B32B 27/06
(52) U.S. Cl. .......................... 428/480
(58) Field of Search .......................... 428/480

(56) References Cited

U.S. PATENT DOCUMENTS 4,946,932 * 8/1990 Jenkins .......................... 528/272
5,266,322 * 11/1993 Myers .......................... 424/401
5,380,520 * 1/1995 Dobbs .......................... 424/61
5,541,251 * 7/1996 Bontinck .......................... 524/507
5,981,642 * 11/1999 Overbeek .......................... 524/457

* cited by examiner

*Primary Examiner*—Paul R. Michl
(74) *Attorney, Agent, or Firm*—Frishauf, Holtz, Goodman, Langer & Chick, P.C.

(57) ABSTRACT

An adhesive composition is disclosed, comprising an ethylenic copolymer comprising a repeating unit derived from an ethylenically unsaturated monomer containing an active methylene group and at least a repeating unit derived from an ethylenically unsaturated monomer, and a copolyester containing, as a copolymerizing component, a repeating unit derived from a dicarboxylic acid containing a sulfonate group or a repeating unit derived from a diol containing a sulfonate group.

15 Claims, No Drawings

ADHESIVE COMPOSITION AND IMAGE FORMING MATERIAL

FIELD OF THE INVENTION

The present invention relates to emulsion type adhesive compositions, and adhesive films and photographic materials by the use thereof, and in particular to adhesive compositions containing a acetoacetoxy group-containing polymer and a sulfonic acid group-containing copolyester, and adhesive films and photographic materials by the use thereof.

BACKGROUND OF THE INVENTION

Adhesives are mainly classified into a solvent type adhesive and a aqueous emulsion type adhesive. Of these, the solvent type adhesive has disadvantages such that the use thereof involves problems such as ignition or fire due to a used solvent and health and environment problems such as environmental pollution. On the contrary, the aqueous emulsion type adhesive has no problem such as above.

Aqueous emulsion type adhesives are comprised of fine water-insoluble resin particles with particle sizes of 0.05 to 10 μm and dispersed in water as a medium. To disperse the resin particles in water, it is necessary to allow an aqueous component to exist on the particle surface. The method for allowing the aqueous component to exist includes adsorption of a surfactant and copolymerization of an aqueous comonomer. When such an aqueous emulsion type adhesive is used, however, the surfactant or aqueous component remains in the formed adhesive coating or is present largely in the interface of the coating, leading to deterioration in coating strength or strength adhered to material. Specifically, low-polar plastic resin films tend to be hardly adhered. Photographic materials, which are generally provided with a sublayer to perform adhesion between a plastic resin film support such as a polyester and a light-sensitive layer, are processed with a developer at a high pH or heated to form images, so that when applying the aqueous emulsion type adhesive described above to the sublayer, it is needed to have adhesion sufficient for such an image forming treatment with a developer or by heating and therefore, an adhesive with higher adhesion is desired.

Attempts to enhance adhesion of the aqueous emulsion type adhesive include a technique of using an emulsion without using a low molecular weight surfactant, for example, JP-A 5-287248 discloses a technique of using polyvinyl alcohol as a protective colloid and as a adhesive, a latex comprised of copolymer of ethylene, vinyl acetate and acetoacetic acid allyl ester (herein, the term, JP-A means an unexamined and published Japanese Patent Application). However, as a sublayer of the photographic material which is to be subjected to the processing described above is insufficient the adhesion. JP-A 63-218952 discloses a technique of incorporating a polymer latex containing an active methylene group into a sublayer of a polyester support. In this technique, its adhesion property is exhibited to a certain extent, but when subjected to recent rapid processing or an image forming treatment by heating, sufficient adhesion was not obtained. Toku-hyo-hei (PCT Application Publication) No. 8-503687 discloses an aqueous coating composition comprised of a copolymer of vinyl acetate and dialkyl maleate, which is polymerized in a polyester containing a sulfonic acid group and a polymer containing an active methylene group. When this polymer mixture composition is applied to photographic materials, however, sufficient adhesion was not obtained after subjected to an image forming treatment by developing or heating.

SUMMARY OF THE INVENTION

Accordingly, an object of the present invention is to provide an adhesive composition exhibiting superior adhesion specifically in polyesters and having sufficient adhesion property as a sublayer of photographic materials, an adhesive films and an image forming material.

The object of the invention described above can be accomplished by the following consitution:

an adhesive composition comprising an ethylenic copolymer comprising a repeating unit derived from an ethylenically unsaturated monomer containing an active methylene group and at least a repeating unit derived from an ethylenically unsaturated monomer, and a copolyester containing, as a copolymerizing component, a repeating unit derived from a dicarboxylic acid containing a sulfonate group or a repeating unit derived from a diol containing a sulfonate group.

DETAILED DESCRIPTION OF THE INVENTION

The above-described copolymer, i.e., polymer containing an active methylene group is preferably represented by the following formula (1):

$$—(A)x—(B)y—(C)z—$$ Formula (1)

wherein A represents a repeating unit derived from an ethylenically unsaturated monomer containing an active methylene group and represented by formula (2) described below, B represents a repeating unit derived from an ethylenically unsaturated monomer selected from the group consisting of a methacrylic acid ester, acrylic acid ester and maleic acid ester, provided that a homopolymer of each of them [i.e., a homopolymer of monomer B, represented by (B)y] exhibits a glass transition temperature of not more than 35° C.; C represents a repeating unit derived from an ethylenically unsaturated monomer, except for A and B described above; x, y and z each are the proportion of each polymeric component, represent in terms of a percentage by weight, provided that $5 \leqq x \leqq 60$, $5 \leqq y \leqq 90$ and $x+y+z=100$.

Formula (2)

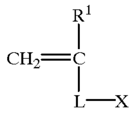

wherein $R^1$ represents a hydrogen atom, an alkyl group having 1 to 4 carbon atoms or a halogen atom; L represents a single bond or a bivalent linkage group, such as one represented by the following formula:

$$—(L^1)m—(L^2)n—$$

wherein $L^1$ represents —CON($R^2$)—, in which $R^2$ represents a hydrogen atom, an alkyl group having 1 to 4 carbon atoms or a substituted alkyl group having 1 to 6 carbon atoms, —COO—, —NHCO—, —OCO—,

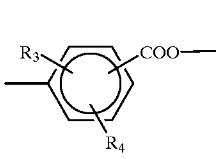 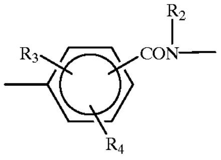

in which $R^3$ and $R^4$ independently represent a hydrogen atom, hydroxy, halogen atom, or an alkyl, alkoxy, acyloxy or aryloxy, each of which may be substituted or unsubstituted; $L^2$ represent a linkage group linking $L^1$ and X. The linkage group represented by L2 is preferably represented by the following formula:

$$-[X^1-(J^1-X^2)p\text{-}(J^2-X^3)q\text{-}(J^3)r]s-$$

where $J^1$, $J^2$ and $J^3$, which may be the same or different, represent —CO—, —$SO_2$—, —CON($R^5$)—, —$SO_2$N($R^5$)—, —N($R^5$)—$R^6$—, —N($R^5$)—$R^6$—N($R^7$)—, —O—, —S—, —N($R^5$)—CO—N($R^7$)—, —N($R^5$)—$SO_2$N($R^7$)—, —COO—, —OCO—, —N($R^5$)$CO_2$—or —N($R^5$)CO—, in which $R^5$ represents a hydrogen atom, an alkyl group having 1 to 6 carbon atoms or substituted alkyl group having 1 to 6 carbon atoms; $R^6$ represents an alkylene group having 1 to 4 carbon atoms and $R^7$ represents a hydrogen atom, an alkyl group having 1 to 6 carbon atoms or substituted alkyl group having 1 to 6 carbon atoms); p, q, r and s each 0 or 1; $X^1$, $X^2$ and $X^3$, which may be the same or different, each represents a straight-chained or branched alkylene, an aralkylene or a phenylene group, each of which has 1 to 10 carbon atoms and may be substituted or unsubstituted. Examples of the alkylene group include methylene, methylmethylene, dimethylmethylene, dimethylene, trimethylene, tetramethylene, pentamethylene, hexamethylene and decylmethylene; Examples of the aralkylene group include benzylidene; and examples of the phenylene group include p-phenylene, m-phenylene and methylphenylene.

X represents a univalent group containing an active methylene group, and preferred examples thereof include $R^8$—CO—$CH_2$—COO—, CN—$CH_2$—COO—, $R^8$—CO—$CH_2$—CO—or $R^8$—CO—$CH_2$—CON($R^5$)—, in which $R^5$ is the same as defined above, $R^8$ represents a substituted or unsubstituted alkyl group having 1 to 12 carbon atoms (e.g., methyl, ethyl, n-butyl, t-butyl, n-nonyl, 2-methoxyethyl, 4-phenoxybutyl, benzyl, 2-methanesulfonamidoethyl, etc.), substituted or unsubstituted aryl group (e.g., phenyl, p-methylphenyl, p-methoxyphenyl, o-chlorophenyl, etc.), substituted or unsubstituted alkoxy group (e.g., methoxy, ethoxy, methoxyethoxy, n-butoxy, etc.), substituted or unsubstituted cycloalkyloxy group (e.g., cyclohexyloxy), substituted or unsubstituted aryloxy group (e.g., phenoxy, p-methylphenoxy, o-chlorophenoxy, p-cyanophenoxy, etc.), and substituted or unsubstituted amino group (e.g., amino, methylamino, ethylamino, dimethylamino, butylamino, etc.).

In the polymer represented by formula (1), examples of the ethylenically unsaturated monomer containing an active methylene group and corresponding to the repeating unit A are shown below, but are not limited to these examples.

MN-1 2-acetoacetoxyethyl methacrylate
MN-2 2-acetoacetoxyethyl acrylate
MN-3 2-acetoacetoxypropyl methacrylate
MN-4 2-acetoacetoxypropyl acrylate
MN-5 2-acetoacetoamidoethyl methacrylate
MN-6 2-acetoacetoamidoethyl acrylate
MN-7 2-cyanoacetoxyethyl methacrylate
MN-8 2-cyanoacetoxyethyl acrylate
MN-9 N-(2-cyanoacetoxyethyl) acrylamide
MN-10 2-propionylacetoxyethyl acrylate
MN-11 N-(2-propionylacetoxyethyl) methacrylamide
MN-12 N-4-(acetoactoxybenzyl)phenyl acrylamide
MN-13 ethylacryloyl acetate
MN-14 acryloylmethyl acetate
MN-15 N-methacryloyloxymethylacetoacetoamide
MN-16 ethylmethacryloyl acetoacetate
MN-17 N-allylcyanoacetoamide
MN-18 methylacryloyl acetoacetate
MN-19 N-(2-methacryloyloxyethyl)cyanoacetoamide
MN-20 p-(2-acetoacetyl)ethylstyrene
MN-21 4-acetoacetyl-1-methacryloylpiperazine
MN-22 ethyl α-acetacetoxymethacrylate
MN-23 N-butyl-N-acryloyloxyethylacetoacetoamide
MN-24 p-(2-acetoacetoxy)ethylstyrene The ethylenically unsaturated monomer of a repeating unit represented by B in formula (1) is such a monomer that a homopolymer of monomer B, corresponding to the copolymerizing component (B)y of formula (1), exhibits a glass transition temperature of not more than 35° C. Examples thereof include an alkylacrylate (e.g., methyl acrylate, ethyl acrylate, n-butyl acrylate, n-butyl acrylate, n-hexyl acrylate, benzyl acrylate, 2-ethyl acrylate, iso-nonyl acrylate, n-dodecyl acrylate, etc.), an alkyl methacrylate (e.g., n-butyl methacrylate, n-hexyl methacrylate, 2-ethylhexyl methacrylate, iso-nonyl methacrylate, n-dodecyl methacrylate, etc.) and dines (e.g., butadiene, isoprene, etc.). Of these is preferred a monomer such that a homopolymer corresponding to the copolymerizing component (B)y of formula (1), exhibits a glass transition temperature of not more than 10° C., and specifically preferred examples thereof include an alkyl acrylate containing an alkyl side chain having 2 or more carbon atoms (e.g., ethyl acrylate, n-butylacrylate, 2-ethylhexyl acrylate, iso-nonyl acrylate, etc.), an alkyl methacrylate containing an alkyl side chain having 6 or more carbon atoms (e.g., n-hexyl methacrylate, 2-ethylhexyl methacrylate) and dienes (e.g., butadiene, isoprene, etc.).

The glass transition temperature value of polymers is described in J. Brandrup and E. H. Immergut, Polymer Handbook Third Ed. (John Wiley & Sons, 1989), VI/page 209 to VI/page 277.

The ethylenically unsaturated monomer of a repeating unit represented by C of formula (1) represents a repeating unit except for B, and it is preferably a repeating unit derived from such a monomer that a homopolymer of monomer C corresponding to the copolymerizing component (C)y of formula (1), exhibits a glass transition temperature of more than 35° C. Examples of such monomers include acrylic acid esters (e.g., t-butyl acrylate, phenyl acrylate, 2-naphthyl acrylate, etc.), methacrylic acid esters (e.g., methyl methacrylate, ethyl methacrylate, 2-hydroxyethyl methacrylate, benzyl methacrylate, 2-hydroxypropyl methacrylate, phenyl methacrylate, cyclohexyl methacrylate, cresyl methacrylate, 4-chlorobenzyl methacrylate, ethylene glycol dimethacrylate, etc.), vinyl esters (e.g., vinyl benzoate, pivaloyloxyethylene, etc.), acrylamides (e.g., acrylamide, methylacrylamide, ethylacrylamide, propylacrylamide, butylacrylamide, t-butylacrylamide, cyclohexylacrylamide, benzylacrylamide, hydroxymethylacrylamide, methoxyethylacrylamide, dimethylaminoethylacrylamide, phenylacrylamide, dimethylacrylamide, β-cyanoethylacrylamide, diacetone acrylamide, etc.), methacrylamides (e.g., methacrylamide, methylmethacrylamide, ethylmethacrylamide, propylmethacrylamide, butylmethacrylamide, t-butylmethacrylamide, cyclohexylmethacrylamide, benzylmethacrylamide, hydroxymethylmethacrylamide, methoxyethylmethacrylamide, dimethylaminoethylmethacrylamide, phenylmethacrylamide, dimethylmethacrylamide, diethylmethacrylamide, β-cyanoethylmethacrylamide, etc.), styrenes (e.g., styrene, methylstyrene, dimethylstyrene, trimethylenestyrene, ethylstyrene, isopropylstyrene, chlorostyrene, methoxystyrene, acetoxystyrene, dichlorostyrene, bromstyrene, vinyl benzoic acid methyl ester, etc.), divinylbenzene, acrylonitrile, methacrylonitrile, N-vinylpyrrolidone, N-vinyloxazolidone, chlorovinylidene, and phenyl vinyl ketone.

The polymer represented by formula (1) may be allowed to copolymerize with a monomer containing an anionic functional group (such as a carboxy group or sulfonic acid group), as described in JP-A 60-15935, 45-3822 and 53-28086, and U.S. Pat. No. 3,700,456, to enhance stability of latex. Examples of such monomers include the following compounds: acrylic acid, methacrylic acid; itaconic acid; maleic acid, monoalkyl itaconate such as monomethyl itaconate and monoethyl itaconate; monoalkyl maleate such as monomethyl maleate and monoethyl maleate; citraconic acid; styrenesulfonic acid; vinylbenzylsulfonic acid; vinylsulfonic acid; acryloyloxyalkylsulfonic acid such as acryloyloxymethylsulfonic acid, acryloyloxyethylsulfonic acid and acryloyloxypropylsulfonic acid; acrylamidoalkylsulfonic acid such as 2-acrylamido-2-methylethanesulfonic acid, 2-acrylamido-2-methylbutanesulfonic acid; and methacrylamidoalkylsulfonic acid such as 2-methaacrylamido-2-methylethanesulfonic acid, 2-meth acrylamido-2-methylpropanesulfonic acid and 2-methacrylamido-2-methylbutanesulfonic acid. These acids may be their salts of alkaline metals (e.g., Na, K) or ammonium ion.

The above-described monomer containing an anionic functional group can be optionally used irrespective of the glass transition temperature of its homopolymer. It is preferably used in an amount of 0.5 to 20% by weight, and more preferably 1 to 10% by weight, based on the total weight of a polymer.

In the invention, the above-described polymer containing an active methylene group preferably exhibits a glass transition temperature of not less than −60° C., and more preferably nor less than −40° C.

The polymer containing an active methylene group used in the invention (hereinafter, also denoted as the active methylene group containing polymer) is preferably prepared through emulsion polymerization. The dispersion particle size is not specifically limited, but preferably within the range of 0.01 to 1.0 μm. In the emulsion polymerization used in the invention, an aqueous soluble polymer is preferably used as an emulsifying agent. In addition thereto, a monomer is emulsified in a mixed solvent of water and a water-miscible organic solvent (e.g., methanol, ethanol, acetone, etc.) and using a radical polymerization initiator, polymerization is conducted generally at a temperature of 30 to 100° C., and preferably 40 to 90° C. The proportion of the water-miscible solvent is 0 to 100%, and preferably 0 to 50% by weight, based on water.

Polymerization reaction is carried out using a radical polymerization initiator of 0.05 to 5% by weight and optionally an emulsifying agent of 0.1 to 10% by weight. Examples of the radical polymerization initiator include azobis compounds, peroxides, hydroperoxides and redox solvents, such as potassium persulfate, ammonium persulfate, t-butyl peroctanoate, benzoyl peroxide, isopropyl carbonate, 2,4-dichlorobenzyl peroxide, methyl ethyl ketone peroxide, cumene hydroperoxide, dicumyl peroxide, 2,2'-azobis isobutylate, 2,2'-azobis(2-amidinopropane)hydrochloride, and a combination of potassium sulfite and sodium hydrogen sulfite.

Anionic, cationic, amphoteric or nonionic surfactants may be used as an emulsifying agent at the time when using the aqueous-soluble polymer. The surfactant may be used in an amount of 0 to 100%, preferably 0 to 25%, and more preferably 0 to 10% by weight, based on the aqueous soluble polymer. Preferred examples of the surfactant include sodium laurate, sodium dodecylsulfate, sodium 1-octoxycarbonylmethyl-1-octoxycarbonylmethanesulfonate, sodium dodecynaphthalenesulfonate, sodium dodecylbenzenesulfonate, sodium dodecylphosphate, cetyltrimethylammonium chloride, dodecytrimethyleneammonium chloride, N-2-ethylhexylpyridinium chloride, polyoxyethylene nonylphenyl ether, and polyoxyethylene sorbitan lauric acid ester. The emulsifying agent may be used in combination thereof at a moment of using the aqueous soluble polymer described below. The emulsifying agent can be used in an amount of 0 to 100%, and preferably 0 to 25% by weight, based on the aqueous soluble polymer.

In preparation of the active methylene group-containing polymer through emulsion polymerization, a aqueous soluble polymer is preferably used. Aqueous soluble polymers used in the invention include aqueous soluble natural polymers and aqueous soluble synthetic polymers, each of which contains, in its molecule, a water-solubilizing anionic, cationic or nonionic group. Preferred examples of the anionic group include carboxylic acid and its salts, sulfonic acid and its salt, phosphoric acid and its salt; preferred examples of the cationic group include tertiary amine and its ammonium salt; and preferred examples of the nonionic group include hydroxy, amido group, methoxy group, alkyleneoxide group such as oxyethylene and heterocyclic group such as pyrrolidone group. Of the aqueous soluble synthetic polymers, anionic or nonionic polymers are preferred, and anionic polymers are more preferred. Polymers containing a sulfonate are still more preferred, such as polystyrenesulfonate and a polymer containing a conjugated diene type sulfonate. The aqueous-soluble polymer can be used in combination thereof.

The aqueous soluble polymer used in the preparation of the active methylene group-containing polymer through emulsion polymerization include aqueous-soluble natural or semi-synthetic polymer, such as alginic acid and its salt, dextran, dextran sulfate, glycogen, arabic gum, albumin, agar, starch derivatives, carboxymethyl cellulose and its salt, hydroxycellulose, cellulose sulfuric acid ester, and their derivatives.

Exemplary examples of the aqueous soluble polymer used in the preparation, through emulsion polymerization, of the polymer according to the invention are shown below, but they are not limited to these examples.

SP-1

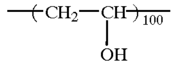

-continued
SP-2
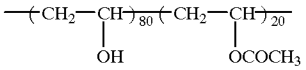
SP-3
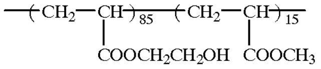
SP-4
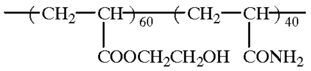
SP-5
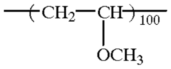
SP-6
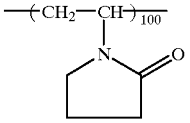
SP-7
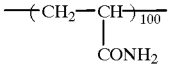
SP-8
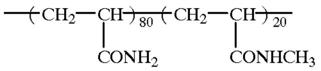
SP-9
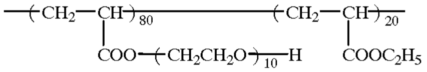
SP-10
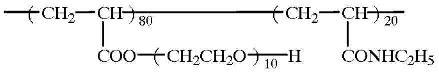
SP-11
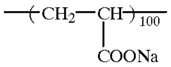
SP-12
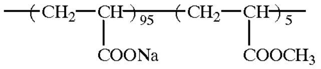
SP-13
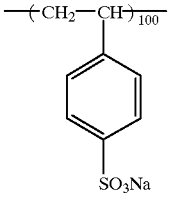
SP-14
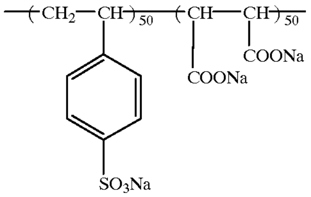
SP-15
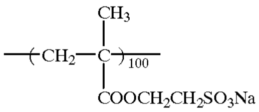
-continued
SP-16
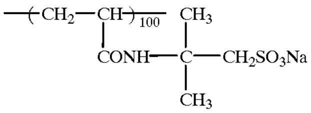
SP-17
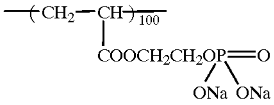
SP-18
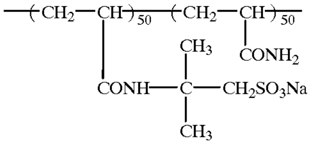
SP-19
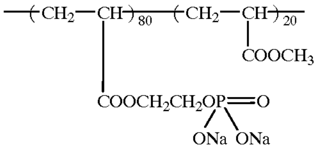
SP-20
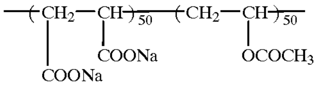
SP-21
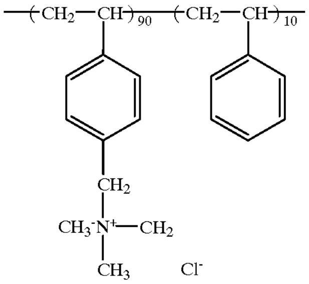
SP-22
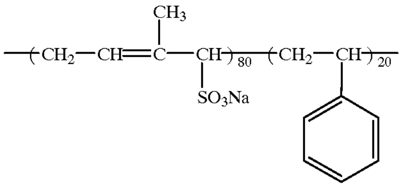
SP-23
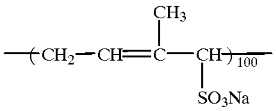
SP-24
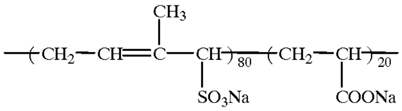

-continued

SP-25

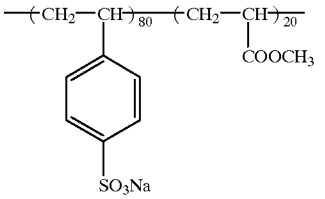

SP-26

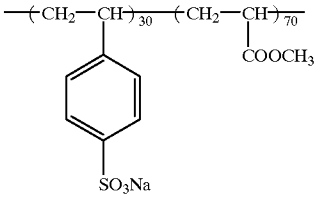

SP-27

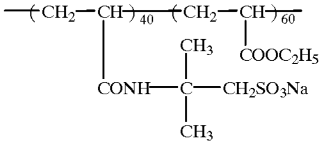

SP-28

Sodium dextransulfate

SP-29

Dextran

SP-30

Soldium alginate

In emulsion polymerization are readily variable a polymerization initiator, the concentration, polymerization temperature and reaction time. Emulsion polymerization reaction may be initiated by adding an initiator to a reaction vessel containing monomer(s), a surfactant, an aqueous soluble polymer and a medium. Alternatively, polymerization may be carried out with adding a part or all of the components.

In the polymer represented by formula (1), the active methylene-containing monomer represented by A or polymer latex are described with respect to the kind and synthetic method in U.S. Pat. Nos. 3,459,790, 3,619,195, 3,929,482 and 3,700,456; West German Patent 2,442,165; European Patent 13,147; and JP-A 50-7362 and 50-146331.

Exemplary examples of active methylene group containing polymer compounds represented by formula (1) are shown below, but are not limited to these examples. The proportion of each copolymerizing component is also shown in Table 1.

TABLE 1

| Compound | Monomer A (wt. ratio*1) | Monomer B (wt. ratio) | Monomer C (wt. ratio) | Aqueous-soluble Polymer/ Surfactant |
|---|---|---|---|---|
| Lx-1 | MN-1 (0.4) | BA (0.2) | St (0.4) | SP-22, S-2 |
| Lx-2 | MN-1 (0.6) | BA (0.1) | St (0.4) | SP-22, S-2 |
| Lx-3 | MN-1 (0.2) | BA (0.3) | St (0.5) | SP-22, S-2 |
| Lx-4 | MN-1 (0.4) | AIN (0.3) | CHMA (0.3) | SP-22, S-2 |
| Lx-5 | MN-1 (0.4) | EA (0.2) | MMA (0.4) | SP-22, S-2 |
| Lx-6 | MN-1 (0.4) | EA (0.2) | St (0.4) | SP-22, S-2 |
| Lx-7 | MN-1 (0.4) | VAc (0.4) | EMA (0.4) | SP-22, S-2 |
| Lx-8 | MN-2 (0.4) | BA (0.2) | St (0.4) | SP-22, S-2 |
| Lx-9 | MN-1 (0.2) | BA (0.3) | St (0.3) GMA (0.2) | SP-22, S-2 |

TABLE 1-continued

| Compound | Monomer A (wt. ratio*1) | Monomer B (wt. ratio) | Monomer C (wt. ratio) | Aqueous-soluble Polymer/ Surfactant |
|---|---|---|---|---|
| Lx-10 | MN-1 (0.4) | AIN (0.3) | St (0.3) | SP-22, S-2 |
| Lx-12 | MN-1 (0.4) | AIN (0.3) | St (0.3) | SP-1, S-2 |
| Lx-13 | MN-1 (0.4) | AIN (0.3) | St (0.3) | SP-2, S-2 |
| Lx-14 | MN-1 (0.4) | AIN (0.3) | St (0.3) | SP-6, S-2 |
| Lx-15 | MN-1 (0.4) | AIN (0.3) | St (0.3) | SP-7, S-2 |
| Lx-16 | MN-1 (0.4) | AIN (0.3) | St (0.3) | SP-8, S-2 |
| Lx-17 | MN-1 (0.4) | AIN (0.3) | St (0.3) | SP-13, S-2 |
| Lx-18 | MN-1 (0.4) | AIN (0.3) | St (0.3) | SP-25, S-2 |
| Lx-19 | MN-1 (0.4) | AIN (0.3) | St (0.3) | SP-26, S-2 |
| Lx-20 | MN-1 (0.4) | AIN (0.3) | St (0.3) | S-2 |
| Lx-21 | MN-1 (0.4) | BA (0.2) | St (0.4) | S-2 |
| Lx-22 | MN-1 (0.4) | BA (0.55) | AA (0.05) | SP-22, S-2 |

*1proportion by weight of a copolymerizing component represented by monomer A of formula (1)

In the Table, the aqueous-soluble polymer and surfactant were used as protective colloid at the time of emulsion polymerization, in which S-2 represents sodium dodecybenzenesulfonate, and the proportion of solid components of the latex was 30%. Further, the term, BA, St, AA, EA, MMA, EMA, VAc, AIN, CHMA and GMA each represent n-butyl acrylate, styrene, acrylic acid, ethyl acrylate, methyl methacrylate, ethyl methacrylate, vinyl acetate, iso-nonyl acrylate, cyclohexylmethacrylate and glycidyl methacrylate, respectively.

The content of the polymer containing an active methylene group in an adhesive composition provided on a film or in a sublayer of a photographic material is preferably 10 to 90% solid, and more preferably 30 to 70% solid by weight. The polymer containing an active methylene group used in the invention is preferably a polymer latex. Herein, the polymer latex refers to a polymeric component contained in the latex.

The polyester contained in the adhesive composition according to the invention is a copolyester obtained using a dicarboxylic acid containing a sulfonate group and/or a sulfonate group-containing, ester-forming derivative, as a copolymerizing component. Thus, the polyester is a copolyester containing, as a copolymerizing component, a repeating unit derived from a bi-functional sulfo-monomer, which contains a sulfonate group attached to an aromatic nucleus (in which the functional group includes carboxy and hydroxy). In cases where the functional group is carboxy, the proportion of the sulfo-monomer is preferably 4 to 25%, and more preferably 5 to 15%, based on the sum of dicarboxylic acid components (which are dicarboxylic acids selected from an aromatic dicarboxylic acid, saturated aliphatic dicarboxylic acid and their combination). In cases where the functional group is hydroxy, the proportion of the sulfo-monomer is preferably 4 to 25%, and more preferably 5 to 15%, based on the sum of diol components.

Dicarboxylic acids used in the invention include an aromatic carboxylic acid (preferably having 8 to 14 carbons), saturated aliphatic carboxylic acid (preferably having 4 to 12 carbons) and alicyclic carboxylic acid (preferably having 8 to 12 carbons). Exemplary examples of the dicarboxylic acids include terephthalic acid, phthalic acid, isophthalic acid, naphthalene-2,6-dicarboxylic acid, cyclohexanedicarboxylic acidcyclohenenediacetic acid, diphenyl-4,4'-dicarboxylic acid, succinic acid, glutaric acid, adipic acid, azelaic acid and sebacic acid. Polyester may be formed using at least two of the dicarboxylic acids described above. The dicarboxylic acids include their acid anhydride, ester and acid chloride.

Diols used as a diol component of the polyester include an alicyclic diol (preferably having 6 to 20 carbon atoms) and an aliphatic diol (preferably having 3 to 20 carbon atoms). Examples thereof include ethylene glycol, diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(,4), 2,2,4-trimethylpentane-diol-(1,3), 2-ethylhexanediol-(1,3), 2,2-diethylpropane-diol-(1,3), hexane-diol-(1,3), 1,4-di-(hydroxyethoxy)benzene, 2,2-bis-(4-hydroxycyclohexyl)-propane, 2,4-dihydroxy-1,1,3,3-tetramethylcyclobutane, 2,2-bis-(3-hydroxyethoxyphenyl)-propane and 2,2-bis-(4-hydroxypropoxyphenyl)-propane. Polyester may be formed using at least two of the diols described above.

The bi-functional sulfo-monomer component of the polyester may be a dicarboxylic acid containing a sulfonate group (i.e., —$SO_3^-$), a diol containing a sulfonate group or a hydroxy acid (or hydroxycarboxylic acid) containing a sulfonate group. Cations of the sulfonate may be $Na^+$, $Li^+$, $K^+$, $NH_4^+$ or substituted ammonium. Substituted ammonium is referred to as an ammonium substituted by an alkyl or hydroxyalkyl having 1 to 4 carbon atoms. Preferred bi-functional sulfo-monomers are those containing a sulfonate group bonded to an aromatic acid nucleus, such as benzene, naphthalene, diphenyl, oxydiphenyl, sulfonyldiphenyl or methylenediphenyl. Thus, sulfophthalic acid, sulfoterephthalic acid, sulfoisophthalic acid, 4-sulfonaphthalene-2,7-dicarboxylic acid and their esters are preferred. More preferably, the bi-functional sulfo-monomer is 5-sodiosulfoisophthalic acid or its ester, and the dicarboxylic acid component is terephthalic acid, isophthalic acid or cyclohexane-dicarboxylic acid.

The copolyester used in the invention is aqueous-soluble. The expression, aqueous-soluble means not only being soluble in water but also being finely dispersible in water.

The copolyester is contained in an adhesive composition provided on the film or in a sublayer of a photographic material, preferably in an amount of 10 to 90% solid by weight, and more preferably 30 to 70% solid by weight. The intrinsic viscosity of the copolyester is preferably not less than 0.25 dl/g, and not more than 0.4 dl/g.

The polymer containing an active methylene group, which comprises a repeating unit derived from an ethylenically unsaturated monomer containing an active methylene group and at least a repeating unit derived from an ethylenically unsaturated monomer, is contained in an adhesive composition provided on the film or in a sublayer of a photographic material, preferably in an amount of 10 to 90% solid by weight, and more preferably 30 to 70% solid by weight.

Exemplary examples of the polyester copolymer (or copolyester) are shown below, but are not limited to these examples. The mole fraction of each component in the copolymer is shown in Table 2.

TABLE 2

| Com- pound | Composition: Dicarboxylic acid (mole fraction) TPA | IPA | CHDA | SIPA | AA | Glycol (mol fraction) EG | CHD | DEG | Intrinsic Viscosity |
|---|---|---|---|---|---|---|---|---|---|
| CPE-1 | 0.4 | 0.38 | 0.14 | 0.08 | 0 | 0.95 | 0 | 0.05 | 0.33 |
| CPE-2 | 0.4 | 0.3 | 0.2 | 0.1 | 0 | 0.95 | 0 | 0.05 | 0.35 |
| CPE-3 | 0.4 | 0.38 | 0.14 | 0.08 | 0 | 1 | 0 | 0 | 0.4 |
| CPE-4 | 0.4 | 0.3 | 0.2 | 0.1 | 0 | 0.65 | 0.3 | 0.05 | 0.36 |
| CPE-5 | 0 | 0.89 | 0 | 0.11 | 0 | 0.81 | 0.14 | 0.05 | 0.45 |
| CPE-6 | 0.4 | 0.4 | 0 | 0.1 | 0.1 | 0.95 | 0 | 0.05 | 0.3 |

In the Table, the terms of the composition represents components of a copolymer, which are comprised of monomer components added at the time of polymerization or component(s) produced in polymerization. The term, TPA, IPA, CHDA, AA, EG, CHD and DEG each represent terephthalic acid, isophthalic acid, cyclohexane-dicarboxylic acid, 5-sodiumsulfoisophthalic acid, adipic acid, ethylene glycol, 1,4-cyclohexanediol and ethylene glycol, respectively.

The content of a polymer containing a repeating unit derived from an ethylenically unsaturated monomer containing an active methylene group and repeating unit derived from an ethylenically unsaturated monomer, and a copolyester containing, as a copolymerizing component, a dicarboxylic acid containing a sulfonate and/or its polyester forming derivative, is preferably not less than 60% by weight in the adhesive composition according to the invention. The adhesive composition may contain other resin components or fine inorganic particles, and adjuvants such as a thickening agent, inorganic filler, polymer emulsion, cross-linking agent, thermosetting polymer, coating aid, plasticizer, dispersing agent, wetting agent, defoaming agent and organic solvent.

It is possible to coat the adhesive composition according to the invention on a substrate to form an adhesive layer, thereby forming a adhesive film. The substrate is not specifically limited, but examples thereof include polyester (such as polyethylene terephthalate and polyethylene naphthalate), poly ethylene, polypropylene, cellulose acetate, polystyrene, polycarbonate films and composite material thereof. The adhesive film and a material to be adhered can be adhered by bring the coating side into contact with the material and then heating them. The heating temperature and time can be optimally set and preferably 30 to 200° C., and more preferably 50 to 140° C.

The adhesive composition according to the invention is usable as a sublayer of image forming materials. Specifically in photosensitive materials forming images through development processing or thermal processing, sufficient adhesion of a support with an image forming layer after image formation can be kept. Photographic material usable in the invention is not specifically limited, including silver halide photographic materials developable with a developing solution and thermally image-forming photographic materials. The thermally image-forming photographic materials include diffusion transfer, sublimation type transfer and thermally processable silver salt photosensitive materials. Silver halide photographic materials usable in the invention are exemplarily described in JP-A 9-146207. Thermally processable photosensitive materials usable in the invention are exemplary described in JP-A 10-69023.

Silver halide photographic materials provided with a sublayer described above will be further described. As a binder used in a silver halide emulsion layer or other hydrophilic colloidal layers are generally used gelatin alone or in combination with other hydrophilic colloidal materials, including gelatin derivatives; graft polymers of gelatin and other synthetic polymers; proteins such as albumin, casein and the like; cellulose derivatives such as hydroxyethylcellulose, carboxymethylcellulose, cellulose sulfuric acid ester, etc.; sugar derivatives such as sodium alginate, dextrin, dextran, dextran sulfate, and the like; and various kinds of synthetic hydrophilic polymers including homopolymers such as polyvinyl alcohol, polyvinyl alcohol partial acetal, poly-N-vinylpyrrolidone, polyacrylic acid, polymethacrylic acid, polyacrylamide, polyvinyl imidazole, polyvinyl pyrazole, and their copolymers. Gelatin usable in the invention include alkali process gelatin, acid process gelatin, hydrolyzed gelatin and enzymatic process gelatin.

Silver halide grains contained in silver halide emulsion used in the invention may be comprised of silver bromide, silver iodobromide, silver iodochloride, silver chlorobromide, silver chlorobromide, silver iodochlorobromide or silver chloride. Of these, silver iodobromide, silver iodochlorobromide and silver chloride are preferred. Silver halide grains used in the invention may be any form, including cubic, octahedral ortetradehedral form, spherical or tabular form, or a potato-like form. Specifically tabular grains are preferred.

To a silver halide emulsion used in the photographic material of the invention are incorporated various kinds of photographic additives at a time before, during or after physical ripening or chemical ripening. As the additives, can be employed compounds as described in Research Discolsure No. 17643 (1978, December), No. 18716 (1979, November) and No. 308119 (1989, December), wherein relevant types of compounds and sections thereof are as follows.

| | RD-17643 | | RD-18716 | RD-308119 | |
|---|---|---|---|---|---|
| Additive | Page | Sec. | Page | Page | Sec. |
| Chemical sensitizer | 23 | III | 648 upper right | 996 | III |
| Sensitizing dye | 23 | IV | 648–649 | 996–8 | III |
| Desensitizing dye | 23 | IV | | 998 | B |
| Dye | 25–26 | VIII | 649–650 | 1003 | VIII |
| Developing accelerator | 29 | XXI | 648 upper right | | |
| Antifoggant/stabilizer | 24 | IV | 649 upper right | 1006–7 | VI |
| Brightening agent | 24 | V | | 998 | V |
| Surfactant | 26–27 | XI | 650 right | 1005–6 | XI |
| Antistatic agent | 27 | XII | 650 right | 1006–7 | XIII |
| Plasticizer | 27 | XII | 650 right | 1006 | XII |
| Slipping agent | 27 | XII | | | |
| Matting agent | 28 | XVI | 650 right | 1008–9 | XVI |
| Binder | 26 | XXII | | 1003–4 | XXII |
| Support | 28 | XVII | 1009 | XVII | |

As supports used in the photographic material of the invention are cited those described in the above-mentioned Research Disclosures. Appropriate supports include plastic films. The surface of the support may be sub-coated or exposed to corona discharge or UV-ray. The silver halide photographic material used in the invention may be optionally provided with an antihalation layer, interlayer or filter layer.

Photographic emulsion layers or other hydrophilic colloidal layers can be coated on the support or on another layer by various coating methods, such as dip coating, roller coating, curtain coating, extrusion coating and slide hopper coating. These methods are detailed in Research Disclosure No. 17643 pages 27–28, item "Coating Procedures".

Thermally processable photosensitive materials are disclosed in D. Morgan and B. Shely, U.S. Pat. Nos. 3,152,904 and 3,457,075, and D. H. Klisterboer, "Thermally Processed Silver Systems" in Imaging processes and Materials Neblette's Eighth Edition, Edited by J. M. Sturge, V. Walworth and A. Shepp, page 2, 1989. Specifically, the photosensitive materials are subjected to heat-development at 80 to 140° C. to form images, without fixing. Accordingly, silver halides or organic silver salts in unexposed portions are remained as they are.

Binders suitable for the thermally processable photosensitive material to which the present invention is applied are transparent or translucent, and generally colorless. Binders are natural polymers, synthetic resins, and polymers and copolymers, other film forming media; for example, gelatin, gum arabic, poly(vinyl alcohol), hydroxyethyl cellulose, cellulose acetate, cellulose acetatebutylate, poly (vinylpyrrolidone), casein, starch, poly(acrylic acid), poly (methylmethacrylic acid), poly(vinyl chloride), poly (methacrylic acid), copoly(styrene-maleic acid anhydride), copoly(styrene-acrylonitrile, copoly(styrene-butadiene, poly (vinyl acetal) series (for example, poly(vinyl formal) and poly(vinyl butyral), poly(ester) series, poly(urethane) series, phenoxy resins, poly(vinylidene chloride), poly(epoxide) series, poly(carbonate) series, poly(vinyl acetate) series, cellulose esters, poly(amide) series. These may be hydrophilic or hydrophobic. There may be provided a non-photosensitive layer on the photosensitive layer to protect the surface of the photosensitive material or prevent abrasions. The binder used in the light insensitive layer may be the same or different from that of the photosensitive layer. The amount of the binder is preferably 1.5 to 10 $g/m^2$, and mpre preferably 1.7 to 8 $g/m^2$.

A variety of adjuvants may be incorporated in any of a light sensitive layer, light insensitive layer or other component layer. In thermally processable photosensitive materials usable in the invention may be employed a surfactant, antioxidant, stabilizer, plasticizer or coating aid. These adjuvants are preferably those which are described in Research Disclosure 176, item 17029 (June, 1978, page 9–15).

Supports employed in the thermally processable photosensitive materials are preferably, in order to obtain predetermined optical density after development processing and to minimize the deformation of images after development processing, plastic films (for example, polyethylene terephthalate, polycarbonate, polyimide, nylon, cellulose triacetate, polyethylene naphthalate).

Of these, as preferred supports, listed are polyethylene terephthalate (hereinafter referred to as PET) and other plastics (hereinafter referred to as SPS) comprising styrene series polymers having a syndioctatic structure. The thickness of the support is between about 50 and about 300 $\mu$m, and is preferably between 70 and 180 $\mu$m.

Furthermore, thermally processed plastic supports may be employed. As acceptable plastics, those described above are listed. The thermal processing of the support, as described herein, is that after film casting and prior to the photosensitive layer coating, these supports are heated to a temperature at least 30° C. higher than the glass transition point by not less than 30° C. and more preferably by at least 40° C. However, when the supports are heated at a temperature higher than the melting point, no advantages of the present invention are obtained.

Plastics employed in the thermally processable photosensitive materials are described below. PET is a plastic in which all the polyester components are composed of polyethylene terephthalate. However, other than polyethylene terephthalate, employed also may be polyesters in which modified polyester components such as acid components, terephthalic acid, naphthalene-2,6-dicaroxylic acid, isophthalic acid, butylenecarboxylic acid, 5-sodiumsulfoisophthalic acid, adipic acid, etc., and as glycol components, ethylene glycol, propylene glycol, butanediol, cyclohexane dimethanol, etc. may be contained in an amount of no more than 10 mole percent, with respect to the total polyester content.

SPS is different from normal polystyrene (atactic polystyrene) and a polystyrene having stereoregularity. The stereoregular structure portion of SPS is termed a racemo chain and the more regular parts increase as 2 chains, 3 chains, 5 chains or more chains, the higher being, the more preferred. In the present invention, the racemo chains are preferably not less than 85 percent for two chains, not less than 75 percent for three chains, not less than 50 percent for five chains, and 30 percent for not less than 5 chains. SPS can be polymerized in accordance with a method described in Japanese Patent Publication Open to Public Inspection No. 3-131843.

As the base casting method of the support and subbing production method which are associated with the present invention, any of those known in the art can be employed. However, those methods described in paragraphs [0030] through [0070] of Japanese Patent Publication Open to Public Inspection No. 9-50094 are preferably employed.

Metal oxides and/or conductive polymers may be incorporated in component layers for the purpose of improving antistatic properties. These materials may be incorporated into any of component layers, and preferably into a sublayer, backing layer or interlayer between the sublayer and photosensitive layer. There are preferably employed conductive compounds described in U.S. Pat. No. 5,244,773.

EXAMPLES

The present invention will be further described based on examples, but embodiments of the present invention are not limited to these examples.

Example 1

Preparation of Adhesive Composition

According to the invention, a latex of a polymer containing an active methylene group (hereinafter, also denoted simply as active methylene latex) and an aqueous copolyester solution was mixed to form an adhesive composition, as shown in Table 3. In the Table, the ratio of the active methylene latex/copolyester is represented by equivalent converted to solid.

Preparation of Adhesive Film

On one side of a PET film of 100 μm or PEN film of 80 μm, each of which was previously subjected to biaxial stretching, the composition described above was coated so as to form a dry thickness of 20 μm and dried to obtain an adhesive film Sample 101 to 119).

Evaluation of Adhesion Property

A. Peel Strength

Two adhesive films were so superposed that the coating side of one film was brought into contact with that of the other film, then heated with an iron and subjected to T-type peeling test in accordance with the procedure of JIS K6845. Results thereof are shown in Table 3.

B. Shear Strength

Similarly, adhesive film were superposed, heated and subjected to shear-peeling test in accordance with the procedure of JIS K6850. Results thereof are also shown in Table 3.

Each strength was represented based on a thickness of adhesive layer being 1 mm.

TABLE 3

| | Adhesive Composition | | | | Adhesion Strength | | |
|---|---|---|---|---|---|---|---|
| Sample No. | Active Methylene Latex | Copolyester | Ratio | Adhesion | T-type peeling (kg/ 25 mm) | Shear-peeling (kg/ 25 mm) | Remark |
| 101 | Lx-1 | CPE-1 | 2/1 | 80° C./ 30 sec. | 33 | 47 | Inv. |
| 102 | Lx-1 | CPE-1 | 2/1 | 60° C./ 60 sec. | 30 | 42 | Inv. |
| 103 | Lx-1 | CPE-1 | 2/1 | 100° C./ 30 sec. | 35 | 50 | Inv. |
| 104 | Lx-1 | CPE-1 | 2/1 | 120° C./ 30 sec. | 28 | 44 | Inv. |
| 105 | Lx-1 | CPE-1 | 1/1 | 80° C./ sec. | 24 | 52 | Inv. |
| 106 | Lx-1 | CPE-1 | 1/2 | 80° C./ sec. | 18 | 44 | Inv. |
| 107 | Lx-3 | CPE-1 | 2/1 | 80° C./ sec. | 26 | 46 | Inv. |
| 108 | Lx-7 | CPE-1 | 2/1 | 80° C./ sec. | 35 | 48 | Inv. |
| 109 | Lx-8 | CPE-1 | 2/1 | 80° C./ sec. | 32 | 50 | Inv. |
| 110 | Lx-9 | CPE-1 | 2/1 | 80° C./ sec. | 40 | 58 | Inv. |
| 111 | Lx-12 | CPE-1 | 2/1 | 80° C./ sec. | 31 | 44 | Inv. |
| 112 | Lx-19 | CPE-1 | 2/1 | 80° C./ sec. | 28 | 42 | Inv. |
| 113 | Lx-21 | CPE-1 | 2/1 | 80° C./ sec. | 22 | 38 | Inv. |
| 114 | Lx-1 | CPE-5 | 2/1 | 80° C./ sec. | 34 | 46 | Inv. |
| 115 | Lx-1 | CPE-1 | 2/1 | 80° C./ 30 sec. | 35 | 49 | Inv. |
| 116 | Lx-9 | CPE-1 | 2/1 | 80° C./ 30 sec. | 42 | 56 | Inv. |
| 117 | Lx-1 | None | | 80° C./ sec. | 18 | 22 | Comp. |
| 118 | None | CPE-1 | | 80° C./ sec. | 7 | 46 | Comp. |

In the Table, Sample 115 and 116 were coated on PEN film, and other samples were coated on PET film. As can be seen from the Table, adhesive films according to the invention exhibited superior adhesion in T-type peeling and shear-peeling.

Example 2

Preparation of Subbed Support 11

Both sides of a biaxially stretched and thermally fixed, 100 μm PET film were subjected to corona discharge treatment of 8 $w/m^2$ min, and further on one side of the support, coating solution a-11 was coated to form a sublayer A-11 of 8 μm dry thickness, and on the other side, coating solution b-11 was coated to form antistatic sublayer B-11 of 0.8 μm dry thickness. Thus, subbed support Sample 11 was obtained.

| Sub-coating solution a-11 | | |
|---|---|---|
| Lx-1 (solid 30%) | 135 | g |
| CPE-1 aqueous solution (solid 15%) | 270 | g |
| (C-1) | 0.6 | g |
| Water to make | 1 | liter |
| Sub-coating solution b-11 | | |
| Lx-1 (solid 30%) | 135 | g |
| CPE-1 aqueous solution (solid 15%) | 270 | g |
| (C-1) | 0.6 | g |
| Water to make | 1 | liter |

Preparation of Subbed Support 12

Sublayers A-11 and B-11 each were subjected to corona discharge of 8 w/$m^2$·min. Then, on sublayer A-11, upper sub-coating solution a-12 was coated to form sublayer A-12 of dry thickness of 0.1 μm, and on sublayer B-11. sub-coating solution b-12 was coated to form antistatic sublayer B-12 of dry thickness of 0.8 μm.

| Upper sub-coating solution a-12 | | |
|---|---|---|
| Gelatin | An amount equivalent to 0.4 | $g/m^2$ |
| (C-1) | 0.2 | g |
| (C-2) | 0.2 | g |
| (C-3) | 0.1 | g |
| Silica particles (av. size of 3 μm) | 0.1 | g |
| Water to make | 1 | liter |
| Upper sub-coating solution b-12 | | |
| (C-4) | 60 | g |
| Latex containing (C-5) (solid 20%) | 80 | g |
| Ammonium sulfate | 0.5 | g |
| (C-6) | 12 | g |
| Polyethylene glycol (weight-averaged molecular weight Of 600) | 6 | g |
| Water to make | 1 | liter |

(C-1)

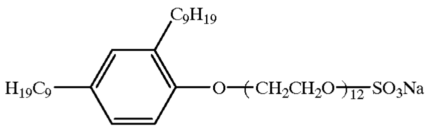

(C-2)

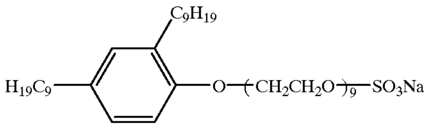

(C-3)

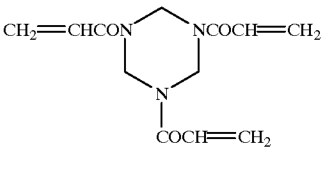

-continued (C-4)

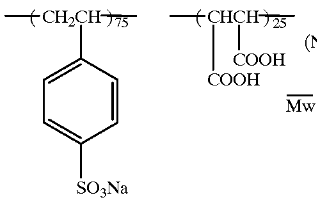

(Numeral: mol%)

$\overline{Mw}$ = 5000

(C-5)

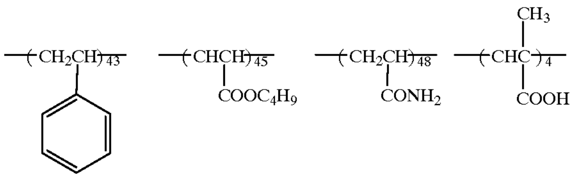

(Numeral: mol%) Av. Particle Size 0.08 μm (C-6)

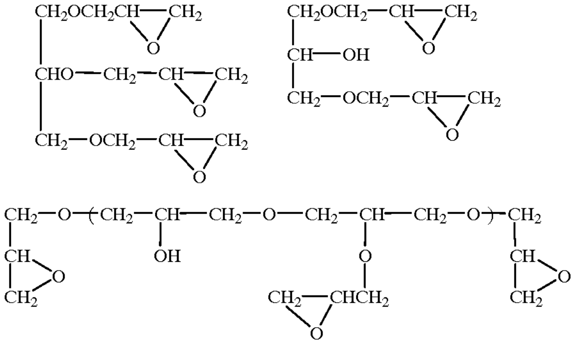

(Mixture)

Subbed support Samples 13 to 27 were similarly prepared provided that an active methylene latex or copolyester was varied, as shown in Table 4.

TABLE 4

| Sample No. | Active Methylene Latex (solid 30%) | Copolyester (solid 15%) | Upper Sublayer |
|---|---|---|---|
| 11 | Lx-1 (135 g) | CPE-1 (270 g) | No |
| 12 | Lx-1 (135 g) | CPE-1 (270 g) | Yes |
| 13 | Lx-1 (270 g) | — (0 g) | No |
| 14 | Lx-1 (243 g) | CPE-1 (54 g) | No |
| 15 | Lx-1 (189 g) | CPE-1 (162 g) | No |
| 16 | Lx-1 (81 g) | CPE-1 (387 g) | No |
| 17 | Lx-1 (27 g) | CPE-1 (486 g) | No |
| 18 | Lx-1 (162 g) | CPE-1 (216 g) | No |
| 19 | Lx-1 (0 g) | CPE-1 (540 g) | No |
| 20 | Lx-3 (162 g) | CPE-1 (216 g) | No |
| 21 | Lx-7 (162 g) | CPE-1 (216 g) | No |
| 22 | Lx-8 (162 g) | CPE-1 (216 g) | No |
| 23 | Lx-9 (162 g) | CPE-1 (216 g) | No |
| 24 | Lx-12 (162 g) | CPE-1 (216 g) | No |
| 25 | Lx-19 (162 g) | CPE-1 (216 g) | No |
| 26 | Lx-21 (162 g) | CPE-1 (216 g) | No |
| 27 | Lx-1 (162 g) | CPE-5 (216 g) | No |

Heat Treatment of Support

In the drying process of sub-coated supports described above, the supports each were heated at 140° C. and thereafter, gradually cooled. On each of the thus prepared supports, layers constituting an image forming material were coated.

Preparation of Emulsion Em-1

A silver iodobromide tabular grain emulsion was prepared as follows.

| | | |
|---|---|---|
| A1 | | |
| | Ossein gelatin | 24.2 g |
| | Water | 9657 ml |
| | HO-$(CH_2CH_2O)n[CH(CH_3)CH_2]_{17}$-$(CH_2CH_2O)mH$ (m + n = 5 − 7) (10% methanol solution) | 1.20 ml |
| | Potassium bromide | 10.8 g |
| | 10% Nitric acid aqueous solution | 160 ml |
| B1 | | |
| | 2.5N Silver nitrate aqueous solution | 2825 ml |
| C1 | | |
| | Potassium bromide | 841 g |
| | Water to make | 2825 ml |
| D1 | | |
| | Ossein gelatin | 121 g |
| | Water | 2040 ml |
| | HO-$(CH_2CH_2O)n[CH(CH_3)CH_2]_{17}$-$(CH_2CH_2O)mH$ (m + n = 5 − 7) (10% methanol solution) | 5.70 ml |
| E1 | | |
| | 1.75N Potassium bromide aqueous solution, in amount for controlling a silver potential | |

Using a stirring mixer described in JP-B 58-58288 and 58-58289 (herein, the term, JP-B means examined and published Japanese Patent), solutions B1 and C1, 475 ml of each were added to solution A1 by the double jet addition in 2.0 min to form nucleus grains. After completing addition, the temperature of the reaction mixture was raised to 60° C. by taking 60 min., then a total amount of solution D1 was added thereto and the pH was adjusted to 5.5 with KOH 3% aqueous solution. Subsequently, solutions B1 and C1 were added at a flow rate of 55.4 ml/min. over a period of 42 min., while a silver potential (which was measured by a silver ion selection electrode with reference to a saturated silver-silver chloride electrode) was controlled within a range of +8 mV to +30 mV. After completing the addition, the resulting emulsion was adjusted to the pH of 6.0 with a 3% KOH aqueous solution and immediately subjected to desalinization-washing to obtain a seed grain emulsion. As a result of microscopic observation of the emulsion, it was shown that not less than 90% of the total grain projected area was accounted for by hexagonal tabular grains with an adjacent edge ratio of 1.0 to 2.0. average thickness of 0.090 μm and average circle-equivalent diameter of 0.510 μm.

To the resulting emulsion at 53° C. were added in the form of a solid particle dispersion spectral sensitizing dye A and spectral sensitizing dye B. Subsequently, an aqueous solution containing 4-hydroxy-6-methyl-1,3,3a,7-tetrazaindene (TAI), adenine, ammonium thiocyanate, chloroauric acid and sodium thiosulfate, a silver iodide fine grain emulsion and a dispersion of containing triphenyphosphine selenide were added and the emulsion was ripen over a period of 2 hr. 30 min. After completion of ripening was added in an optimal amount of TAI, as a stabilizer.

Sensitizing dyes, additives and their addition amounts (per mol of AgX) are as follows.

| | |
|---|---|
| Spectral sensitizing dye A | |
| 5,5'-dichloro-9-ethyl-3,3'-di-(3-sulfopropyl)-oxacarbocyanine sodium salt anhydride | 450 mg |

-continued

| | |
|---|---|
| Spectral sensitizing dye B | |
| 5,5'-di-(butoxycarbonyl)-1,1'-di-ethyl-3,3'-di-(4-sulfobutyl)benzimidazolocarbocyanine Sodium salt anhydride | 8 mg |
| 4-Hydroxy-6-methyl-1,3,3a,7-tetrazaindene (TAI) | 60 mg |
| Adenine | 15 mg |
| Sodium thiosulfate | 5.0 mg |
| Ammonium thiocyanate | 50 mg |
| Chloroauric acid | 2.5 mg |
| Silver iodide fine grain emulsion (average size of 0.05 μm) | 5 mmol equivalent |
| Triphenyphosphine selenide | 6.0 mg |
| Stabilizer (TAI) | 750 mg |

The solid particle dispersion of the spectral sensitizing dye was prepared in accordance with the method described in JP-A 5-297496. Thus, a given amount of the dye was added into water at 27° C. and stirred for 30 to 120 min., by means of a high-speed stirrer (Dissolver) at 3500 r.p.m. The dispersion of triphenylphosphine selenide was prepared in the following manner. Triphenylphosphine selenide of 120 g was dissolved in ethyl acetate of 30 kg at 50° C. On the other hand, gelatin of 3.8 kg was dissolved in water of 38 kg and was added thereto sodium dodecybenzenesulfonate 25 wt. % aqueous solution of 93 g. Both solutions were mixed and dispersed at 50° C. for 30 min. by means of a high-speed stirrer type dispersing machine provided with a dissolver with a diameter of 10 cm; thereafter the mixture was further stirred under reduced pressure to remove ethyl acetate until the residual concentration of ethyl acetate reached 0.3 wt. % or less. Water was added to the resulting dispersion to male a total amount of 80 kg. A part of the thus prepared dispersion was used in the above-described experiment.

Preparation of Emulsion Em-2

Using emulsion Em-1 as a seed emulsion and the following solutions, tabular silver iodobromide grain emulsion Em-2 was prepared.

| | | |
|---|---|---|
| A2 | | |
| | Ossein gelatin | 19.4 g |
| | $HO(CH_2CH_2O)_n[CH(CH_3)CH_2O]_{17}(CH_2CH_2O)_mH$ (m + n = 5 to 7) 10% ethanol solution | 2.00 ml |
| | Potassium iodide | 7.00 g |
| | Em-1 (Seed emulsion) | 1.55 mol equivalent |
| | Water to make | 2800 ml |
| B2 | | |
| | Potassium bromide | 1493 g |
| | water to make | 3585 ml |
| C2 | | |
| | Silver nitrate | 2131 g |
| | Water to make | 3585 ml |
| D2 | | |
| | Fine grain emulsion* comprising gelatin of 3 wt. % and silver iodide fine grains (average size 0.05 μm) | 0.028 mol equivalent |

*The fine grain emulsion was prepared by adding an aqueous solution containing 7.06 mol of silver nitrate and aqueous solution containing 7.06 mol of potassium iodide, each 2 liters to 6.64 liters of aqueous gelatin 5.0 wt. % solution containing 0.06 mol of potassium iodide by taking 10 min., while the pH was maintained at 2.0 with nitric acid and the temperature was kept at 40° C. After forming grains, the pH was adjusted to 6.0.

To a reaction vessel containing solution A2 at 55° C., solutions B2 and C2, each, half amount thereof were added with vigorous stirring, while the pH was kept at 5.8. The pH was raised to 8.8 with 1% KOH aqueous solution and solutions B2 and C2 and solution D2 were simultaneously added until all of solution D2 was added. The pH was adjusted to 6.9 with citric acid 0.5% aqueous solution and residual solutions B2 and C2 were further added by double jet addition, taking 25 min, while the pAg was kept at 8.0. The flow rate of solutions B2 and C2 was acceleratedly varied in response to a critical growth rate so as to prevent from polydispersion due to nucleation and Ostwald ripening.

After completing addition, the emulsion was desalted and redispersed and then the pH and pAg were respectively adjusted to 5.80 and 8.2 at 40° C. As a result of electron-microscopic observation, the resulting emulsion was proved to be comprised of tabular silver halide grains with an average circle-equivalent diameter of 0.91, an average thickness of 0.23 μm, an average aspect ratio of 4.0 and grain size distribution width (standard deviation of grain size/average grain size) of 20.5%.

To the resulting seed grain emulsion at 47° C. were added a silver iodide fine grain emulsion (average grain size of 0.05 μm), 390 mg of spectral sensitizing dye A and 4 mg of spectral sensitizing dye, each in the form of a solid particle dispersion. Subsequently, an aqueous solution containing 10 mg of adenine, 50 mg of ammonium thiocyanate, 2.0 mg of chloroauric acid and 3.3 mg of sodium thiosulfate, 5 mmol equivalent of a silver iodide fine grain emulsion (average size of 0.05 μm) and a dispersion of containing 4.0 mg of triphenyphosphine selenide were added and the emulsion was ripen over a period of 2 hr. 30 min. After completion of ripening was added an appropriate amount of TAI, as a stabilizer.

Sensitizing dyes, additives and their addition amounts (per mol of AgX) are as follows.

| | |
|---|---|
| Spectral sensitizing dye A: | |
| 5,5'-dichloro-9-ethyl-3,3'-di-(3-sulfopropyl)-oxacarbocyanine sodium salt anhydride | 390 mg |
| Spectral sensitizing dye B: | |
| 5,5'-di-(butoxycarbonyl)-1,1'-di-ethyl-3,3'-di-(4-sulfobutyl)benzimidazolocarbocyanine sodium salt anhydride | 4 mg |
| Adenine | 10 mg |
| Sodium thiosulfate | 3.3 mg |
| Ammonium thiocyanate | 50 mg |
| Chloroauric acid | 2.0 mg |
| Silver iodide fine grain emulsion (average size of 0.05 μm) | 5 mmol equivalent |
| Triphenyphosphine selenide | 4.0 mg |
| Stabilizer (TAI) | 750 mg |

The solid particle dispersion of the spectral sensitizing dye was prepared in accordance with the method described in JP-A 5-297496. Thus, a given amount of the dye was added into water at 27° C. and stirred for 30 to 120 min., by means of a high-speed stirrer (Dissolver) at 3500 r.p.m. The dispersion of triphenylphosphine selenide was prepared in the following manner. Triphenylphosphine selenide of 120 g was dissolved in ethyl acetate of 30 kg at 50° C. On the other hand, gelatin of 3.8 kg was dissolved in water of 38 kg and was added thereto sodium dodecybenzenesulfonate 25 wt. % aqueous solution of 93 g. Both solutions were mixed and dispersed at 50° C. for 30 min. by means of a high-speed stirrer type dispersing machine provided with a dissolver with a diameter of 10 cm; thereafter the mixture was further stirred under reduced pressure to remove ethyl acetate until the residual concentration of ethyl acetate reached 0.3 wt. % or less. Water was added to the resulting dispersion to male a total amount of 80 kg. A part of the thus prepared dispersion was used in the above-described experiment.

The thus prepared emulsions Em-1 and Em-2 were blended in a ratio by weight of 6:4, and adjuvants described below were added thereto to prepare an emulsion coating solution. Furthermore, coating solutions of a protective layer and cross-over cut layer were also prepared.

Preparation of Photographic Material Sample

On both sides of polyethylene terephthalate film base blue-tinted with a density of 0.15 and having a thickness of 175 μm, the following cross-over cut layer, emulsion layer, interlayer and protective layer were coated in this order from the base so as to have a silver coverage of 1.8 $g/m^2$. protective layer gelatin amount of 0.4 $g/m^2$, interlayer gelatin amount of 0.4 $g/m^2$, emulsion layer gelatin amount of 1.5 $g/m^2$ and cross-over cut layer gelatin amount of 0.2 $g/m^2$ (each per one side) and dried to prepare photographic material Sample 1.

| | |
|---|---|
| First layer (Cross-over cut layer) | |
| Solid particle dispersion of dye AH | 180 $mg/m^2$ |
| Gelatin | 0.2 $g/m^2$ |
| Sodium dodecylbenzenesulfonate | 5 $mg/m^2$ |
| Compound (I) | 5 $mg/m^2$ |
| Latex (L) | 0.2 $g/m^2$ |
| 2,4-Dichloro-6-hydroxy-1,3,5-triazine sodium salt | 5 $mg/m^2$ |
| Colloidal silica (av. size 0.014 μm) | 10 $mg/m^2$ |
| Hardener (A) | 2 $mg/m^2$ |
| Second layer (Emulsion layer) | |

To the blended silver halide emulsion described above, the following adjuvants were added:

| | |
|---|---|
| Compound G | 0.5 $mg/m^2$ |
| 2,6-Bis(hydroxyamino)-4-diethylamino-1,3,5-triazine | 5 $mg/m^2$ |
| t-Butyl-catechol | 130 $mg/m^2$ |
| Polyvinyl pyrrolidone (M.W. 10,000) | 35 $mg/m^2$ |
| Styrene-anhydrous maleic acid copolymer | 80 $mg/m^2$ |
| Sodium polystyrenesulfonate | 80 $mg/m^2$ |
| Trimethylolpropane | 350 $mg/m^2$ |
| Diethylene glycol | 50 $mg/m^2$ |
| Nitrophenyl-triphenyl-phosphonium chloride | 20 $mg/m^2$ |
| Ammonium 1,3-dihydroxybenzene-4-sulfonate | 500 $mg/m^2$ |
| Sodium 2-mercaptobenzimidazole-5-sulfonate | 5 $mg/m^2$ |
| Compound (H) | 0.5 $mg/m^2$ |
| $n\text{-}C_4H_9OCH_2CH(OH)CH_2N(CH_2COOH)_2$ | 350 $mg/m^2$ |
| Compound (M) | 5 $mg/m^2$ |
| Compound (N) | 5 $mg/m^2$ |
| Colloidal silica | 0.5 $mg/m^2$ |
| Latex (L) | 0.2 $mg/m^2$ |
| Dextran (av. M.W. 1000) | 0.2 $mg/m^2$ |
| Compound (P) | 0.2 $mg/m^2$ |
| Compound (Q) | 0.2 $mg/m^2$ |
| Third layer (Interlayer) | |
| Gelatin | 0.4 $g/m^2$ |
| Formaldehyde | 10 $mg/m^2$ |
| 2,4-Dichloro-6-hydroxy-1,3,5-triazine sodium salt | 5 $mg/m^2$ |
| Bis-vinylsulfonylmethyl ether | 18 $mg/m^2$ |
| Active methylene latex (Lx-1) | 0.1 $g/m^2$ |
| Poly(sodium acrylate) | 10 $mg/m^2$ |
| Compound (S-1) | 3 $mg/m^2$ |
| Compound (K) | 5 $mg/m^2$ |
| Hardener (B) | 1 $mg/m^2$ |

-continued

| | |
|---|---|
| Fourth layer (Protective layer) | |
| Gelatin | 0.4 g/$m^2$ |
| Matting agent of polymethyl methaacrylate (area-averaged particle size 7.0 $\mu$m) | 50 mg/$m^2$ |
| Formaldehyde | 10 mg/$m^2$ |
| 2,4-Dichloro-6-hydroxy-1,3,5-triazine sodium salt | 5 mg/$m^2$ |
| Bis-vinylsulfonylmethyl ether | 18 mg/$m^2$ |
| Active methylene latex (Lx-1) | 0.1 g/$m^2$ |
| Polyacrylamide (av. M.W. 10,000) | 0.05 g/$m^2$ |
| Polyacrylic acid sodium salt | 20 mg/$m^2$ |
| Polysiloxane (S1) | 20 mg/$m^2$ |
| Compound (I) | 12 mg/$m^2$ |
| Compound (J) | 2 mg/$m^2$ |
| Compound (S-1) | 7 mg/$m^2$ |
| Compound (K) | 15 mg/$m^2$ |
| Compound (O) | 50 mg/$m^2$ |
| Compound (S-2) | 5 mg/$m^2$ |
| $C_9F_{19}O(CH_2CH_2O)_{11}H$ | 3 mg/$m^2$ |
| $C_8F_{17}SO_2N(C_3H_7)$-$(CH_2CH_2O)_{15}H$ | 2 mg/$m^2$ |
| $C_8F_{17}SO_2N(C_3H_7)$-$(CH_2CH_2O)_4$-$(CH_2)_4SO_3Na$ | 1 mg/$m^2$ |
| Hardener (B) | 1.5 mg/$m^2$ |

The amounts of adjuvants are each per one side and the silver coating weight was 1.3 g/$m^2$ of one side.

Compound (G)

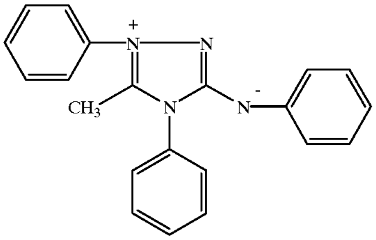

Compound (H)

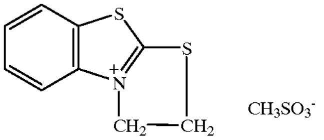

Compound (I)

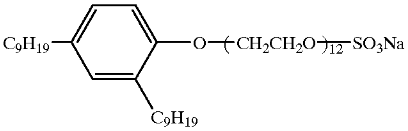

Compound (J)

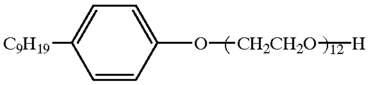

Compound (K)

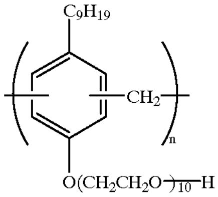

(Mixture of n = 2–5)

-continued

Compound (S-1)

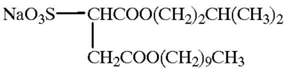

Compound (S-2)

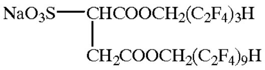

Latex (L)

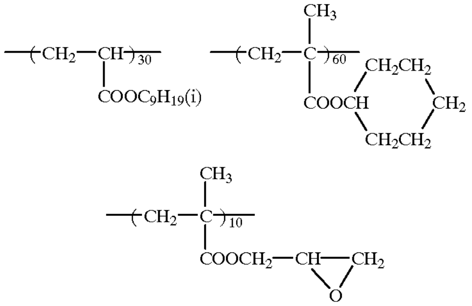

Polysiloxane (S1)

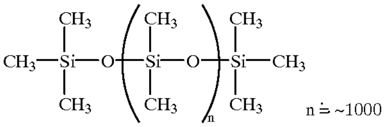

Solid fine particle dispersion dye (AH)

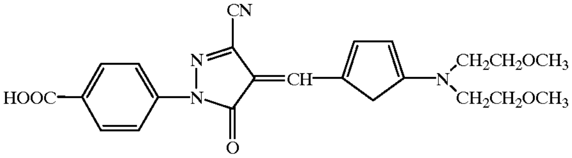

Compound (O)

$C_{11}H_{23}CONH(CH_2CH_2O)_5H$

Compound (M)

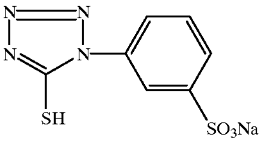

Compound (N)

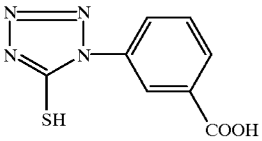

Hardener (A)

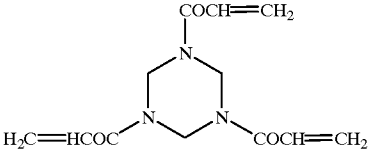

Compound (P)

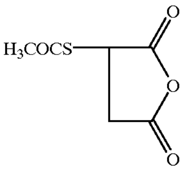

-continued

Compound (Q)

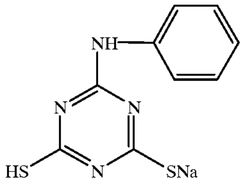

Hardener (B)

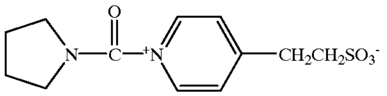

Each photosensitive material sample was sandwiched with fluorescent intensifying screens, exposed to X-rays through Penetrometer type B (available from Konica Medical Corp.) and then processed with SR-DF processing solutions at a developing temperature of 35° C. in a total processing time of 45 sec., using an automatic processor, SRX-503 (available from Konica Corp.), in which the replenishing rate of a developing or fixing solution was 210 $ml/m^2$.

Adhesion Test

Each of unprocessed and processes photographic material samples was evaluated in the following manner. The emulsion side of the sample was slightly cut with a razor in lattice pattern and a cellophane adhesive tape was adhered thereon, subsequently, the tape was abruptly peeled off. Adhesion strength was represented by the percentage of the remained light sensitive layer based on the area adhered with the tape.

TABLE 5

| Sample | | Adhesion Strength (%) | | | |
|---|---|---|---|---|---|
| | | Unprocessed | Processed Portion | | |
| No. | Support | Portion | Exposed | Non-exposed | Remark |
| 201 | 11 | 100 | 100 | 100 | Inv. |
| 202 | 12 | 100 | 100 | 100 | Inv. |
| 203 | 13 | 40 | 20 | 40 | Comp. |
| 204 | 14 | 80 | 100 | 100 | Inv. |
| 205 | 15 | 100 | 100 | 100 | Inv. |
| 206 | 16 | 100 | 100 | 100 | Inv. |
| 207 | 17 | 100 | 80 | 80 | Inv. |
| 208 | 18 | 100 | 100 | 100 | Inv. |
| 209 | 19 | 100 | 0 | 20 | Comp. |
| 210 | 20 | 100 | 80 | 100 | Inv. |
| 211 | 21 | 100 | 100 | 100 | Inv. |
| 212 | 22 | 100 | 100 | 100 | Inv. |
| 213 | 23 | 100 | 100 | 100 | Inv. |
| 214 | 24 | 100 | 60 | 80 | Inv. |
| 215 | 25 | 100 | 80 | 100 | Inv. |
| 216 | 26 | 80 | 60 | 80 | Inv. |
| 217 | 27 | 100 | 100 | 100 | Inv. |

Example 3

On each of the supports prepared in Example 2 were coated component layer of a thermally developable photosensitive material according to the following procedure.

Preparation of Emulsion A

In 900 ml of water were dissolved 7.5 g of inert gelatin and 10 mg of potassium bromide. After adjusting the temperature to 35° C. and the pH to 3.0, 370 ml of an aqueous soulution containing 74 g of silver nitrate, an aqueous solution containing potassium bromide and potassium iodide in a mole ratio of 98/2, $1\times10^{-6}$ mole of $Ir(NO)Cl_6$ salt per mole of silver, and $1\times10^{-4}$ mole of rhodium chloride salt per mole of silver were added employing a controlled double-jet method while maintaining the pAg at 7.7. Subsequently, 4-hydroxy-6-methyl-1,3,3a,7-tetraazaindene was added and the pH was adjusted to 5 using NaOH. Thus, obtained was cubic silver iodobromide grains having an average grain size (i.e., circular equivalent diameter) of 0.06 μm, a variation coefficient of grain size distribution 8 percent, and a [100] plane ratio of 87 percent. The resulting emulsion was subjected to desalting through coagulation precipitation employing an coagulant. After that, 0.1 g of phenoxyethanol was added, and the pH and pAg were adjusted to 5.9 and 7.5, respectively to obtain a silver halide emulsion. Further, the resulting emulsion was chemically ripened with chloroauric acid and inorganic sulfur.

Preparation of Sodium Behenate Solution

In 945 ml of water were dissolved 32.4 g of behenic acid, 9.9 g of arachidic acid and 5.6 g of stearic acid at 90° C. Thereafter, an aqueous 1.5M sodium hydroxide solution was added with stirring at a high speed. Subsequently, 0.93 ml of concentrated nitric acid was added thereto and cooled 55° C. with stirring for a period of 30 min. to obtain a sodium behenate solution.

Preparation of Pre-formed Emulsion Containing Silver Behenate and Silver Halide A To the sodium behenate solution described above was added 15.1 g of silver halide emulsion A described above. After adjusting the pH to 8.1 with a sodium hydroxide aqueous solution, 147 ml of 1M silver nitrate aqueous solution was added thereto in 7 min. and after further stirring for 20 min., soluble salts was removed through ultrafiltration. The resulting silver behenate dispersion was comprised of particles having an average particle size of 0.8 μm and monodispersity (i.e., variation coefficient of particle size) of 8%. After forming flock of the dispersion, water was removed, and washing and removal of water were repeated further 6 times, and then dried.

Preparation of Photosensitive Emulsion

To the resulting pre-formed emulsion, 544 g of a polyvinyl butyral (Av. M.W. of 3,000) methyl ethyl ketone solution (17 wt %) and 107 g of toluene were gradually added and dispersed with stirring at 4000 psi. On the support were coated the following layers to obtain a photosensitive material, wherein drying was conducted at 60° C. for 15 min.

Backing-side Coating

The following composition solution was coated.

| | |
|---|---|
| Cellulose acetate (10% methyl ethyl ketone solution) | 15 $ml/m^2$ |
| Dye-B | 7 $mg/m^2$ |
| Dye-C | 7 $mg/m^2$ |
| Matting agent (monodispersed silica with average particle size of 10 μm and monodispersity of 15%) | 30 $mg/m^2$ |
| $C_9H_{17}$-$C_6H_4$-$SO_3Na$ | 10 $mg/m^2$ |

Dye-B

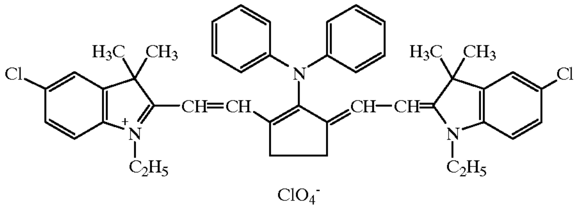

Dye-C

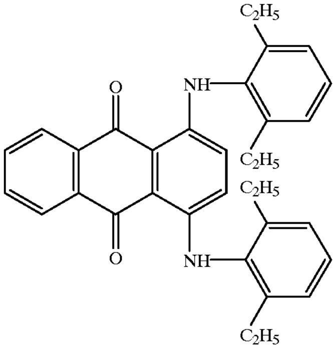

Photosensitive Layer-side Coating

Photosensitive Layer 1

The following composition solution was coated so as to have a silver coverage of 2.1 g/m$^2$.

| | | |
|---|---|---|
| Pre-formed emulsion | 240 | g |
| Sensitizing dye-1 (0.1% methanol solution) | 1.7 | ml |
| Pyridinium bromide perbromide (6% methanol solution) | 3 | ml |
| Calcium bromide (0.1% methanol solution) | 1.7 | ml |
| Antifoggant-2 (10% methanol solution) | 1.2 | ml |
| 2-(4-Chlorobenzoyl)-benzoic acid (12% methanol solution) | 9.2 | ml |
| 2-Mercaptobenzimidazole (1% methanol solution) | 11 | ml |
| Tribromomethylsulfoquinoline (5% methanol solution) | 17 | ml |
| Developer-1 (20% methanol solution) | 29.5 | ml |

Sensitizing dye-1

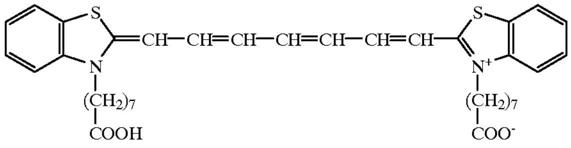

Sensitizing dye-1

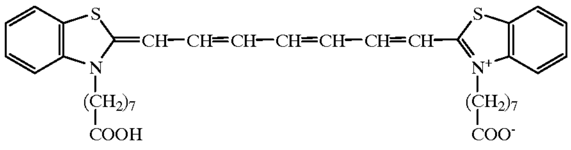

-continued

Antifoggant-2

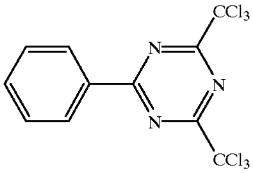

Developer-1

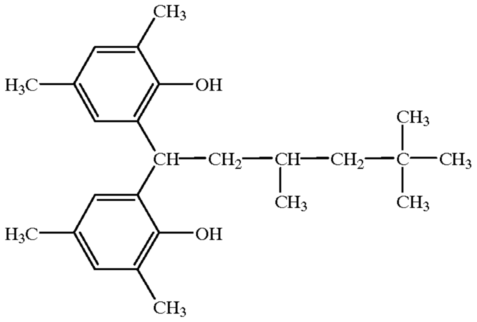

Surface-protective Layer

The following composition was coated on the photosensitive layer.

| | | |
|---|---|---|
| Acetone | 35 | ml/m$^2$ |
| Methyl ethyl ketone | 17 | ml/m$^2$ |
| Cellulose acetate | 2.3 | g/m$^2$ |
| Methanol | 7 | ml/m$^2$ |
| Phthalazinone | 250 | mg/m$^2$ |
| 4-Methylphthalic acid | 180 | mg/m$^2$ |
| Tetrachlorophthalic acid | 150 | mg/m$^2$ |
| Tetrachlorophthalic acid anhydride | 170 | mg/m$^2$ |
| Matting agent (monodispersed silica with average particle size of 10 μm and monodispersity of 15%) | 70 | mg/m$^2$ |
| $C_9H_{17}$-$C_6H_4$-$SO_3Na$ | 10 | mg/m$^2$ |

Exposure and Processing

The thus prepared photosensitive materials each were exposed using an imager having 810 nm semiconductor laser and then thermally developed at 110° C. for 15 sec. using an automatic processor provided with a heat drum. Exposure and development were conducted in an environment at 23° C. and 50% RH.

Adhesion Test

Each of unprocessed and processes photographic material samples was evaluated in the following manner. The emulsion side of the sample was slightly cut with a razor in lattice pattern and a cellophane adhesive tape was adhered thereon, subsequently, the tape was abruptly peeled off. Adhesion strength was represented by the percentage of the remained light sensitive layer based on the area adhered with the tape.

TABLE 6

| | | Adhesion Strength (%) | | |
|---|---|---|---|---|
| Sample No. | Support | Unprocessed Portion | Processed Portion | Remark |
| 301 | 11 | 100 | 100 | Inv. |
| 302 | 12 | 100 | 100 | Inv. |
| 303 | 13 | 20 | 50 | Comp. |

TABLE 6-continued

| Sample No. | Support | Adhesion Strength (%) Unprocessed Portion | Processed Portion | Remark |
|---|---|---|---|---|
| 304 | 14 | 80 | 100 | Inv. |
| 305 | 15 | 100 | 100 | Inv. |
| 306 | 16 | 100 | 100 | Inv. |
| 307 | 17 | 80 | 80 | Inv. |
| 308 | 18 | 100 | 100 | Inv. |
| 309 | 19 | 20 | 0 | Comp. |
| 310 | 20 | 100 | 100 | Inv. |
| 311 | 21 | 100 | 100 | Inv. |
| 312 | 22 | 100 | 100 | Inv. |
| 313 | 23 | 100 | 100 | Inv. |
| 314 | 24 | 80 | 80 | Inv. |
| 315 | 25 | 100 | 100 | Inv. |
| 316 | 26 | 100 | 60 | Inv. |
| 317 | 27 | 100 | 100 | Inv. |

What is claimed is:

1. A film for photographic use comprising a support and coated thereon an adhesive composition containing a polymer comprising a repeating unit derived from an ethylenically unsaturated monomer containing an active methylene group and at least a repeating unit derived from an ethylenically unsaturated monomer, and a polyester comprising a repeating unit derived from a dicarboxylic acid containing a sulfonate group or a repeating unit derived from a diol containing a sulfonate group.

2. The film of claim 1, wherein said polymer comprises a repeating unit derived from an ethylenically unsaturated monomer containing an active methylene group and at least a repeating unit derived from an ethylenically unsaturated monomer selected from the group consisting of an acrylic acid ester, a methacrylic acid ester, a maleic acid ester and a diene.

3. The film of claim 1, wherein said repeating unit derived from a dicarboxylic acid containing a sulfonate group is contained in an amount of from 4 to 25 mol %, based on total repeating units derived from a dicarboxylic acid contained in the polyester.

4. The film of claim 1, wherein said repeating unit derived from a diol containing a sulfonate group is contained in an amount of from 4 to 25 mol %, based on total repeating units derived from a diol contained in the polyester.

5. The film of claim 1, wherein said polyester comprises a repeating unit derived from a dicarboxylic acid containing a sulfonate group, at least a repeating unit derived from a dicarboxylic acid and at least a repeating unit derived from a diol.

6. The film of claim 1, wherein said dicarboxylic acid containing a sulfonate group or said diol containing a sulfonate group is selected from the group consisting of a sulfophthalic acid, a sulfoterephthalic acid, a sulfoisophthalic acid and a 2-sulfonaphthalene-2,7-dicarboxylic acid.

7. The film of claim 1, wherein said ethylenically unsaturated monomer containing an active methylene group is represented by the following formula (2):

formula (2)

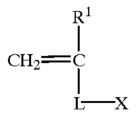

wherein $R^1$ represents a hydrogen atom, an alkyl group having 1 to 4 carbon atoms or a halogen atom; L represents a single bond or a bivalent linkage group and X represents a univalent group containing an active methylene group.

8. The film of claim 1, wherein said polymer comprising a repeating unit derived from an ethylenically unsaturated monomer containing an active methylene group and at least a repeating unit derived from an ethylenically unsaturated monomer is represented by the following formula (1):

$$—(A)x\text{-}(B)y\text{-}(C)z \qquad \text{formula (1)}$$

wherein A represents a repeating unit derived from an ethylenically unsaturated monomer containing an active methylene group and represented by formula (2) below; B represents a repeating unit derived from an ethylenically unsaturated monomer selected from the group consisting of a methacrylic acid ester, an acrylic acid ester and a maleic acid ester, provided that a homopolymer corresponding to a copolymerizing component represented by (B)y exhibits a glass transition temperature of not more than 35° C.; C represents a repeating unit derived from an ethylenically unsaturated monomer other than said A and B; x, y and z represent a percentage by weight of each component, provided that $5 \leqq x \leqq 60$, $5 \leqq y \leqq 90$ and $x+y+z=100$:

formula (2)

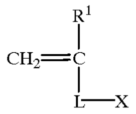

wherein $R^1$ represents a hydrogen atom, an alkyl group having 1 to 4 carbon atoms or a halogen atom; L represents a single bond or a bivalent linkage group and X represents a univalent group containing an active methylene group.

9. The film of claim 8, wherein said glass transition temperature is not less than −60° C.

10. The film of claim 1, said adhesive composition containing said polymer of 10 to 90% by weight as a solid component.

11. The film of claim 1, said adhesive composition containing said polyester of 10 to 90% by weight as a solid component.

12. The film of claim 8, wherein said dicarboxylic acid containing a sulfonate group or said diol containing a sulfonate group is selected from the group consisting of a sulfophthalic acid, a sulfoterephthalic acid, a sulfoisophthalic acid and a 2-sulfonaphthalene-2,7-dicarboxylic acid; said repeating unit derived from a dicarboxylic acid containing a sulfonate group or repeating unit derived from a diol containing a sulfonate group being contained in an amount of from 4 to 25 mol %, based on total repeating units derived from a dicarboxylic acid contained in the polyester.

13. The film of claim 12, wherein repeating unit derived from a dicarboxylic acid containing a sulfonate group or repeating unit derived from a diol containing a sulfonate group is contained in an amount of from 5 to 15 mol %, based on total repeating units derived from a dicarboxylic acid contained in the polyester.

14. The film of claim 13, wherein said polymer and polyester are contained in an amount of not less than 60% by weight, based on the composition.

15. The film of claim 9, said adhesive composition being a latex.

* * * * *